United States Patent
Antani et al.

(10) Patent No.: US 9,390,146 B2
(45) Date of Patent: *Jul. 12, 2016

(54) DYNAMIC STRUCTURAL MANAGEMENT OF A DISTRIBUTED CACHING INFRASTRUCTURE

(75) Inventors: Snehal S. Antani, Hyde Park, NY (US); Erik J. Burckart, Raleigh, NC (US); Rohit D. Kelapure, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 711 days.

This patent is subject to a terminal disclaimer.

(21) Appl. No.: 13/406,846

(22) Filed: Feb. 28, 2012

(65) Prior Publication Data

US 2012/0215877 A1    Aug. 23, 2012

Related U.S. Application Data

(60) Division of application No. 12/982,806, filed on Dec. 30, 2010, which is a continuation-in-part of application No. 12/605,136, filed on Oct. 23, 2009.

(51) Int. Cl.
*G06F 15/16* (2006.01)
*G06F 17/30* (2006.01)

(52) U.S. Cl.
CPC .... *G06F 17/30545* (2013.01); *G06F 17/30457* (2013.01)

(58) Field of Classification Search
CPC .................................................. H04L 67/2842
USPC ................................................. 709/217, 219
See application file for complete search history.

(56) References Cited

U.S. PATENT DOCUMENTS

| | | | |
|---|---|---|---|
| 6,915,386 B2 | 7/2005 | Doyle | |
| 8,868,715 B2 * | 10/2014 | Bearden et al. | 709/224 |
| 8,935,315 B2 * | 1/2015 | Hudson et al. | 709/203 |
| 2002/0049608 A1 * | 4/2002 | Hartsell | G06Q 10/10 709/226 |
| 2003/0210694 A1 * | 11/2003 | Jayaraman et al. | 370/392 |
| 2006/0253461 A1 * | 11/2006 | de Bonet | G06F 17/30902 |
| 2008/0201331 A1 * | 8/2008 | Eriksen et al. | 707/10 |

OTHER PUBLICATIONS

"Scaling the N-Tier Architecture"; Sun Microsystems, Inc.; Sep. 2000.*

* cited by examiner

*Primary Examiner* — Wing F Chan
*Assistant Examiner* — Andrew Woo
(74) *Attorney, Agent, or Firm* — Steven M. Greenberg, Esq.; CRGO Law

(57) ABSTRACT

Embodiments of the present invention provide a method, system and computer program product for the dynamic structural management of an n-Tier distributed caching infrastructure. In an embodiment of the invention, a method of dynamic structural management of an n-Tier distributed caching infrastructure includes establishing a communicative connection to a plurality of cache servers arranged in respective tier nodes in an n-Tier cache, collecting performance metrics for each of the cache servers in the respective tier nodes of the n-Tier cache, identifying a characteristic of a specific cache resource in a corresponding one of the tier nodes of the n-Tier crossing a threshold, and dynamically structuring a set of cache resources including the specific cache resource to account for the identified characteristic.

6 Claims, 4 Drawing Sheets

Dynamic Distributed Cache Hierarchy Management

DYNAMIC STRUCTURAL MANAGEMENT OF A DISTRIBUTED CACHING INFRASTRUCTURE

CROSS-REFERENCE TO RELATED APPLICATIONS

This patent application is a Divisional of U.S. patent application Ser. No. 12/982,806, filed Dec. 30, 2010, currently pending, which claims the benefit under 35 U.S.C. §120 as a continuation-in-part of presently pending U.S. patent application Ser. No. 12/605,136, entitled DEFINING ENFORCING AND GOVERNING PERFORMANCE GOALS OF A DISTRIBUTED CACHING INFRASTRUCTURE, filed on Oct. 23, 2009, the entire teachings of which are incorporated herein by reference.

BACKGROUND OF THE INVENTION

1. Field of the Invention

The present invention relates to the field of cache management and more particularly to management of a distributed caching infrastructure.

2. Description of the Related Art

In an efficient admissions control and capacity planning policy, minimal resources can be allocated automatically to satisfy the requirements of a specified service level agreement (SLA), leaving the remaining resources for later use. An SLA is an agreement between a computing service provider and a computing service consumer that specifies a minimum level of service to be provided by the service provider on behalf of the consumer. The typical SLA includes one or more network traffic terms that either limit the amount and type of resources that the subscribing customer can consume for a given rate, or guarantee the amount and quality of service (QoS) of resources that the provider will provide to the subscribing customer for a given rate.

For example, a subscribing consumer can agree to an SLA in which the consumer agrees to consume only a particular quantity of network bandwidth offered by the provider. Conversely, the SLA can require the provider to guarantee access to the subscribing consumer to at least a minimum amount of bandwidth. Also, the SLA can require the provider to provide a certain QoS over the provided minimum amount of bandwidth.

When considering the terms of an SLA, content and application hosts provision server resources for their subscribing customers, co-hosted server applications or services, according to the resource demands of the customers at their expected loads. Since outsourced hosting can be viewed as a competitive industry sector, content and application hosts must manage their resources efficiently. Logically, to ensure that the customers receive the promised level of service in the SLA, content and application hosts can be configured to survive a worst-case load. Yet, the worst-case approach can unnecessarily tax the resources of the content host or the application host as the case may be, even when those resources are not required to service a given load. Hence, rather than over-provisioning resources, efficient admission control and capacity planning policies can be designed merely to limit rather than eliminate the risk of meeting the worst-case demand.

While SLA management and enforcement has become part and parcel of ordinary application hosting relationships between consumer and host, Extreme Transaction Processing (XTP) provides new challenges in the use and enforcement of the SLA. XTP is a technology used by application hosts to handle exceptionally large numbers of concurrent requests. Serving such a large volume of concurrent requests can be made possible in XTP by distributing the load resulting from the concurrent requests on computer clusters or whole grid computing networks. Further, general XTP supporting architectures often rely upon aggressive caching across an n-Tier caching infrastructure (a multi-tiered cache structure), affinity routing (the intelligent routing of a request to business logic executing nearest to the requisite data consumed by the business logic), and decreasing data-access latency via the "MapReduce" framework commonly used to support distributed computing on large data sets on clusters of computers. Thus, effective management of the multi-tiered cache structure can be critical to meeting the obligations set forth under an SLA.

BRIEF SUMMARY OF THE INVENTION

Embodiments of the present invention address deficiencies of the art in respect to performance management in an n-Tier caching architecture and provide a novel and non-obvious method, system and computer program product for the dynamic structural management of an n-Tier distributed caching infrastructure. In an embodiment of the invention, a method of dynamic structural management of an n-Tier distributed caching infrastructure includes establishing a communicative connection to a plurality of cache servers arranged in respective tier nodes in an n-Tier cache, collecting performance metrics for each of the cache servers in the respective tier nodes of the n-Tier cache, identifying a characteristic of a specific cache resource in a corresponding one of the tier nodes of the n-Tier crossing a threshold, and dynamically structuring a set of cache resources including the specific cache resource to account for the identified characteristic.

In this regard, in one aspect of the embodiment, identifying a characteristic of a specific cache resource in a corresponding one of the tier nodes of the n-Tier crossing a threshold can include identifying a utilization disparity amongst children cache servers supporting different cache clients in a common set of cache clients and a common parent cache server, for example the underutilization of one of the cache servers. As such, caching support for the different cache clients of the common set of cache clients can be consolidated in the cache server demonstrating cache underutilization. In another aspect of the embodiment, identifying a characteristic of a specific cache resource in a corresponding one of the tier nodes of the n-Tier crossing a threshold can include identifying a set of geographically proximate cache devices supporting a cache server. In response, a partitioned cluster of the geographically proximate cache devices can be established, the cache devices individually caching data pertaining to a corresponding unique topic assigned by the cache server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic structural management of an n-Tier distributed caching infrastructure. In accordance with an embodiment of the present invention, characteristics of caching resources in an n-Tier distributed caching infrastructure can be analyzed. In response to detecting a threshold characteristic such as a particular degree of utilization or a particular proximity to other caching resources, the structure of the caching resources can be adapted according to the threshold characteristic.

For example, in response to detecting amongst a set of cache servers servicing common cache clients, underutilization of one of the cache servers in the set, another of the cache servers in the set can be consolidated with the underutilized one of the cache servers. As another example, in response to detecting a threshold geographic proximity between caching devices servicing a cache server in the n-Tier distributed caching infrastructure, a cluster can be established for the geographically proximate caching devices such that each of the caching devices performs caching for data for a corresponding topic and one of the caching devices acting as a master caching device can route caching requests to different slave ones of the caching devices in the cluster according to a topic for each of the requests.

Figure 1:
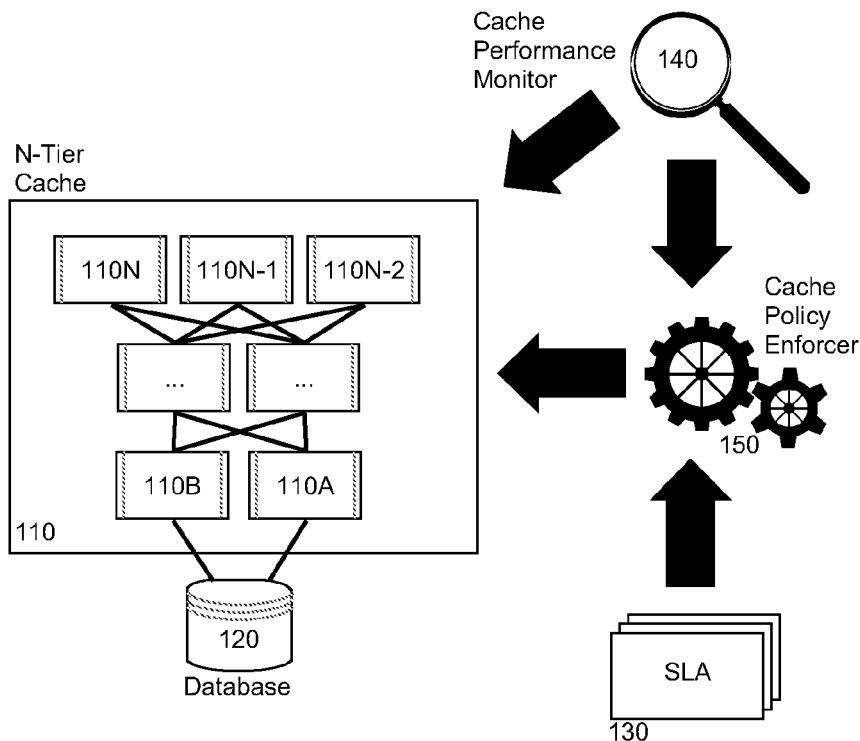
FIG. 1 is a pictorial illustration of a process for enforcing performance goals in an n-Tier distributed caching infrastructure.

In further illustration, FIG. 1 pictorially depicts a process for enforcing performance goals in an n-Tier distributed caching infrastructure. As shown in FIG. 1, an n-Tier cache 110 can be configured to include multiple different tiers of server caches 110A . . . 110N-1 for data stored in a database 120. Performance goals for the n-Tier cache 110 can be established within terms of one or more SLAs 130. A cache performance monitor 140 can monitor the performance of the n-Tier cache 110 in the context, by way of example, of retrieval times for retrieval requests from the different server caches 110A . . . 110N-1 in the n-Tier cache 110. When the measured performance is determined to likely cause a breach in one or more terms of an SLA 130, cache policy enforcer 150 can apply corrective action to one or more of the server caches 110A . . . 110N-1, for instance by establishing server affinity for specified data or a specified query in respect to an offending one of the server caches 110A . . . 110N-1, by increasing the cache size of an offending one of the server caches 110A . . . 110N-1, by allocating additional CPU cycles to an offending one of the server caches 110A . . . 110N-1, or by directing a re-structuring of cache resources in the n-Tier cache 110, to name only a few remedial measures.

Figure 2:
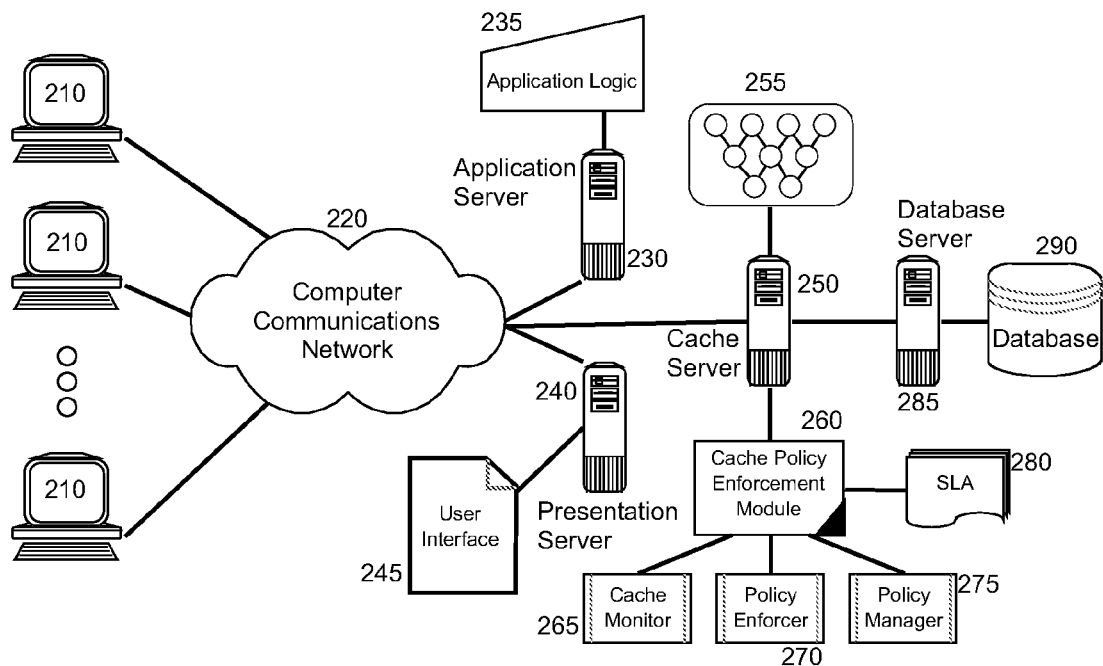
FIG. 2 is a schematic illustration of a computer data processing system arranged with an n-Tier distributed caching infrastructure; and, FIG. 3 is a block diagram illustrating a process for dynamic structural management of an n-Tier distributed caching infrastructure based upon cache server utilization.

In further illustration, FIG. 2 is a schematic illustration of a computer data processing system arranged with an n-Tier distributed caching infrastructure. The system can include an application server 230 with processor and memory hosting the execution of application logic 235 for use by coupled clients 210 over computer communications network 220. A presentation server 240, also with processor and memory, further can be provided, such as a Web server, to provide a user interface 245 for the application logic 235 to the coupled clients 210 so as to provide a mode of access by the coupled clients 210 to the application logic 235 executing in application server 230. Finally, a database server 285 can be communicatively linked to the application server 230 such that data in a companion database 290 can be used and managed by the application logic 235 and accessed through the application logic 235 by the coupled clients 210.

Notably, a cache server 250 can be disposed within the communicative path between the database server 285 and the application server 230. The cache server 250 can provide caching services for data stored in the database 290 as requested by the application logic 235 executing in the application server 230. Further, an n-Tier cache 255 can be managed by the cache server 250 so as to implement an n-Tier caching architecture for data within the database 290 utilized by the application logic 235 in servicing requests from the coupled clients 210 through the user interface 245 provided by the presentation server 240.

In accordance with an embodiment of the present invention, a cache policy enforcement module 260 can be coupled to the cache server 250. The cache policy enforcement module 260 can include computer usable program code loaded from a computer readable medium into the memory of the cache server 250 (or other coupled server) and executed by a processor of the cache server 250 (or other coupled server). The cache policy enforcement module 260 can include each of a cache monitor portion 265, a policy enforcer portion 270 and a policy manager portion 275. Further, the cache policy enforcement module 260 can be configured to access one or more SLAs 280 defining performance objectives for the n-Tier cache 255.

The policy manager portion 275 can include a set of code instructions for execution by a processor for adding, modifying and deleting the performance objectives of the n-Tier cache 255 in order to meet the terms of one or more of the SLAs 280. In this regard, the code instructions of the policy manager portion 275 can provide access by an administrator to establish specific performance objectives of the cache servers of the n-Tier cache 255 such as response time expected of a given cache server in the n-Tier cache 255.

The cache monitor portion 265, in turn, can include a set of code instructions for execution by a processor for monitoring the performance of each of the cache servers in the n-Tier cache 255 such as response time for each of the cache servers or a utilization of different cache servers in serving different cache clients. Finally, the policy enforcer portion 270 can include a set of code instructions for execution by a processor for applying remedial measures to an offending one of the cache servers in the n-Tier cache 255 when the offending one of the cache servers in the n-Tier cache 255 is determined to have demonstrated observed performance falling short of the performance objectives specified by the policy manager portion 275 and likely to result in a breach of one or more of the terms of the SLAs 280.

Figure 3:
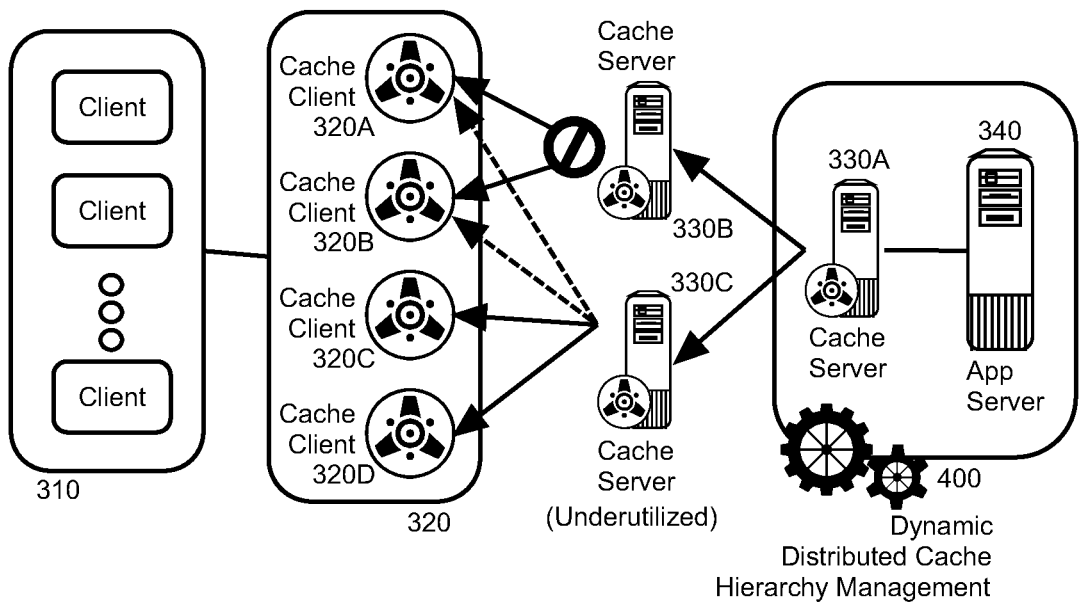

Of note, part and parcel of the effective management of the n-Tier cache 255 can include the dynamic restructuring of cache resources in response to detecting threshold characteristics of different cache resources of the n-Tier cache 255 as reported by the cache monitor portion 265. In yet further illustration, FIG. 3 is a block diagram illustrating a process for dynamic structural management of an n-Tier distributed caching infrastructure based upon cache server utilization. As shown in FIG. 3, different application consuming clients 310 can receive caching services from multiple different caching clients 320—namely different computing applications utilizing the caching services of the cache servers 330B, 330C in distributing data to the application consuming clients 310. The cache servers 330B, 330C can be the hierarchical children of cache server 33A operating in application server 340 in an n-Tier cache.

Dynamic distributed cache hierarchy management logic 400 can interact with the cache server 330A to detect utilization rates of both cache servers 330B, 330C servicing the same set of cache clients 320—namely the cache server 330B servicing cache clients 320A, 320B and cache server 330C servicing cache clients 320C, 320D. When the utilization of one of the cache servers 330C is determined to be underutilized beyond a threshold utilization, the logic 400 can direct the consolidation of the cache servers 330B, 330C so that the cache server 330C services the cache clients 320A, 320B, 320C, 320D. Conversely, when the utilization of one of the cache servers 330C is determined to be overutilized beyond a threshold utilization, the logic 400 can direct the separation of caching responsibilities from the cache server 330C so that the cache server 330C services the cache clients 320C, 320D and the cache server 330B services cache clients 320A, 320B.

Figure 4:
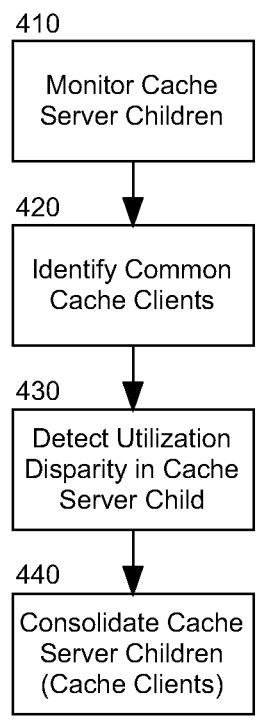
FIG. 4 is a flow chart illustrating a process for dynamic structural management of an n-Tier distributed caching infrastructure based upon cache server utilization.

In illustration of the operation of the logic 400, FIG. 4 is a flow chart illustrating a process for dynamic structural management of an n-Tier distributed caching infrastructure based upon cache server utilization. Beginning in block 410, the cache server children of a cache server can be monitored for utilization. Additionally, in block 420, common cache clients of the cache server children can be identified. In block 430, a utilization disparity—for instance an underutilization condition—can be identified in one of the cache server children sharing common caching clients with another of the cache server children. In response, in block 440, the caching responsibility for the caching clients can be consolidated into a single one of the cache server children sharing the common caching clients.

Figure 5A:
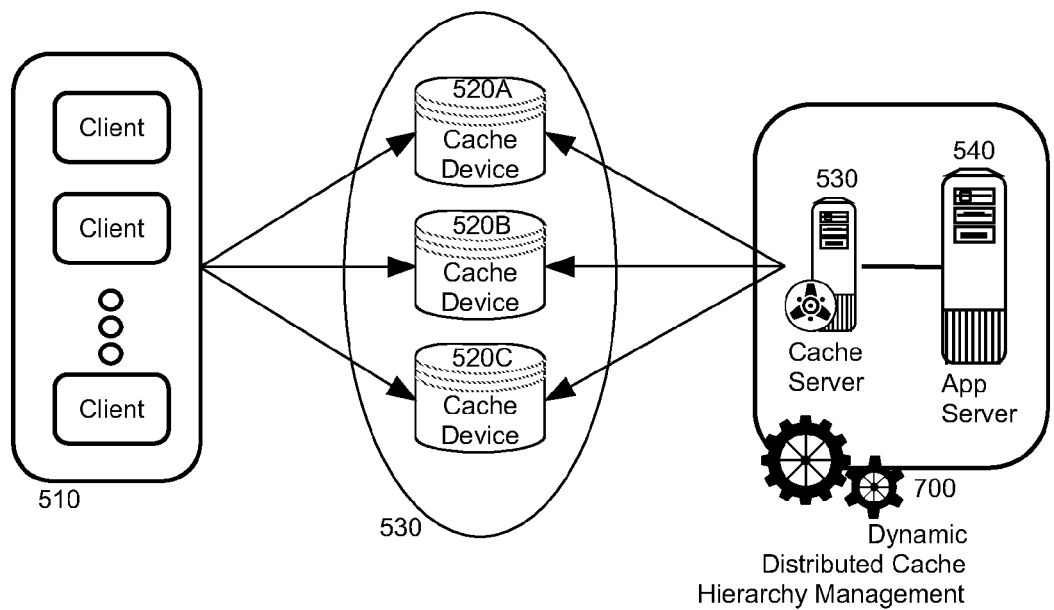
FIGS. 5A and 5B, taken together, are a block diagram illustrating a process for clustering of cache devices of an n-Tier distributed caching infrastructure based upon cache device geographic proximity.

In addition to responding to threshold utilization of cache server children sharing common caching clients, the dynamic distributed cache hierarchy management can respond to cache devices managed by cache servers that are detected to have been positioned with geographic proximity. In even yet further illustration, FIGS. 5A and 5B, taken together, are a block diagram illustrating a process for clustering of cache devices of an n-Tier distributed caching infrastructure based upon cache device geographic proximity. As shown in FIG. 5A, different cache clients 510 can access cached data within cache devices 520A, 520B, 520C managed by cache server 530 operating in application server 540.

Figure 5B:
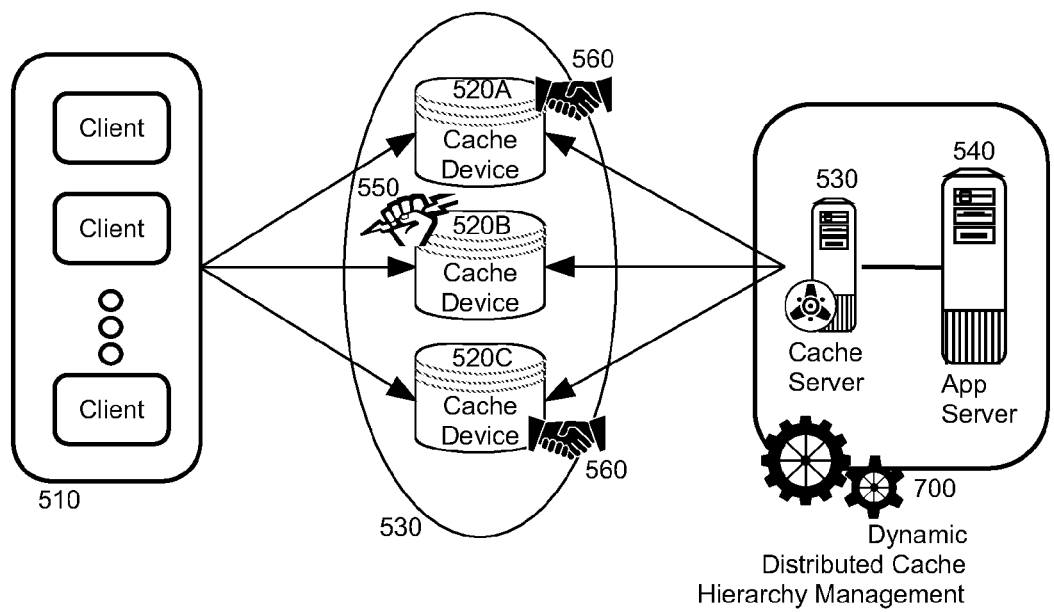

The dynamic distributed cache hierarchy management logic 300 can detect that the cache devices 520A, 520B, 520C have been positioned within geographic proximity to one another—for example within a common data center. In response, as shown in FIG. 5B, the cache devices 520A, 520B, 520C can be defined as a cluster 530 of partitioned caches. One of the cache devices 520B can be assigned the status as a master cache device 550 and the remaining cache devices 520A, 520C can be assigned the status as slave devices 560.

The dynamic distributed cache hierarchy management logic 700 can establish different topics for data serviced by the cache server 530 and the master device 550 can assign one or more of the topics to each different slave device 560. For example, the master device 550 can maintain a routing table of topics and associated slave devices 560 and the master device 550 can distribute the routing table to the slave devices 560. Once assigned a topic, the slave device 560 can listen for cache requests pertaining to the topic and can respond to corresponding cache requests accordingly.

Optionally, each of the cache devices 520A, 520B, 520C can be designated a server or a client. As a client, a cache device 520A, 520B, 520C merely listens for cache updates for an associated topic or topics as assigned by the master 550. As a server, however, a cache device 520A, 520B, 520C can both listen for cache updates for an associated topic and also can serve to other peer ones of the cache devices 520A, 520B, 520C cache updates for other topics. In this way, when the cache server 530 becomes overutilized, the cache server 530 can designate a server one of the cache devices 520A, 520B, 520C as a cache server 530 to manage cache updates for a selection of topics.

Figure 6:
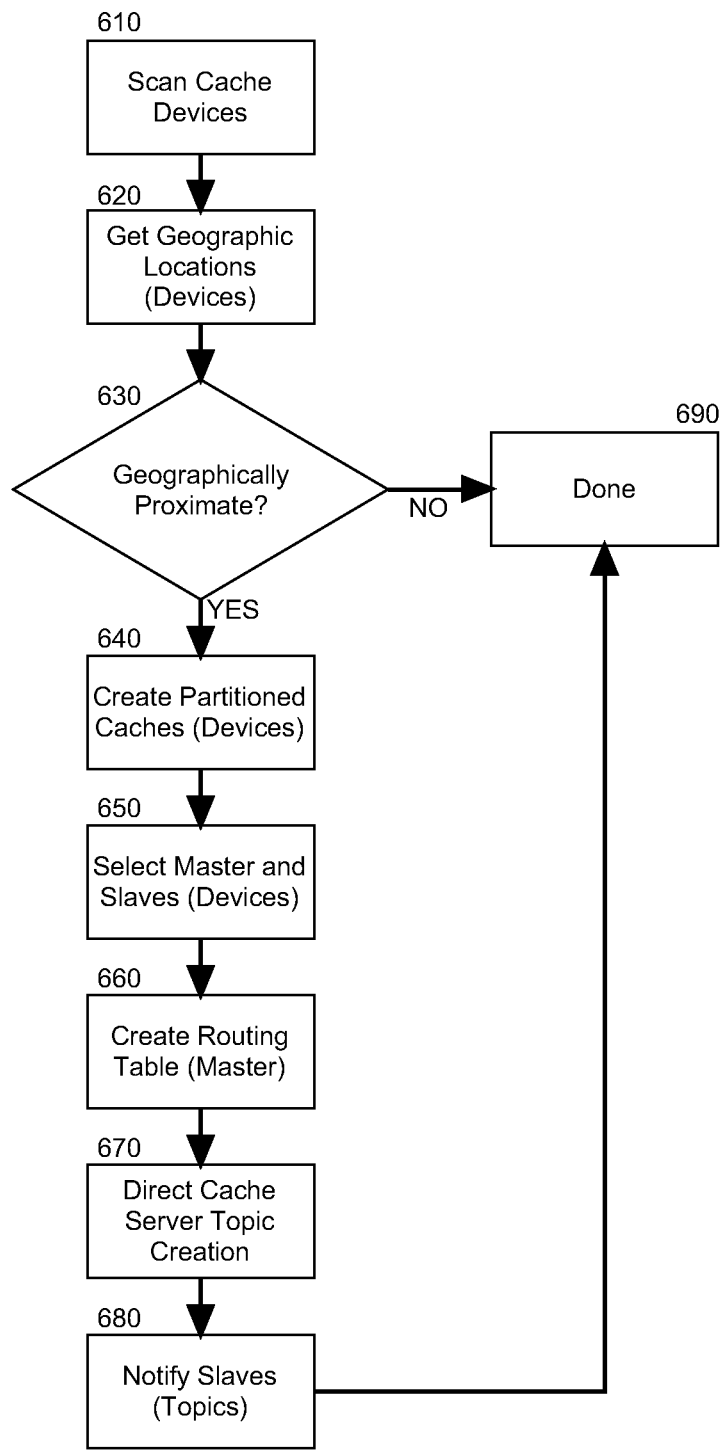
FIG. 6 is a flow chart illustrating a process for clustering of cache devices of an n-Tier distributed caching infrastructure based upon cache device geographic proximity.

Referring now to FIG. 6, a flow chart has been illustrated to show a process for clustering of cache devices of an n-Tier distributed caching infrastructure based upon cache device geographic proximity. Beginning in block 610, different cache devices supporting a cache server in an n-Tier cache can be scanned and in block 620, the geographic location of each scanned cache device can be determined. In decision block 630, it can be determined if the scanned cache devices are geographically proximate to one another within a threshold distance. If so, in block 640 a partitioned set of caches can be arranged with the scanned cache devices.

In block 650, one of the scanned cache devices in the partitioned set can be designated a master device and the remaining cache devices can be designated slave devices. In block 660, a routing table can be established in the master cache device and the cache server can be directed to establish different topics for cache updates for inclusion in the routing table. In block 680, the routing table can be provided to the different slave devices to indicate which topic or topics are to be associated with each slave device. Finally, in block 690 the process can end. In this way, the geographically proximate cache devices can be dynamically structured into an arrangement of cache devices efficiently servicing only a subset of cache updates pertaining to specifically assigned topics in order to improve the performance of the n-Tier cache.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method of dynamic structural management of an n-Tier distributed caching infrastructure, the method comprising:
    establishing a communicative connection to multiple different cache servers arranged in respective tier nodes in an n-Tier cache;
    collecting performance metrics for each of the cache servers in the respective tier nodes of the n-Tier cache;
    identifying a characteristic of a specific cache resource of a corresponding one of the multiple different cache servers in a corresponding one of the tier nodes of the n-Tier that has a value which crosses a pre-determined threshold by identifying a utilization disparity amongst children cache servers supporting different cache clients in a common set of cache clients and a common parent cache server; and,
    dynamically structuring a set of cache resources including the specific cache resource to account for the identified characteristic.

2. The method of claim 1, wherein the utilization disparity is the underutilization of one of the cache servers.

3. The method of claim 2, wherein dynamically structuring a set of cache resources including the specific cache resource to account for the identified characteristic, comprises consolidating caching support for the different cache clients of the common set of cache clients in the cache server demonstrating cache underutilization.

4. The method of claim 1, wherein identifying a characteristic of a specific cache resource in a corresponding one of the tier nodes of the n-Tier crossing a threshold, comprises identifying a set of geographically proximate cache devices supporting a cache server instead of identifying a utilization disparity amongst children cache servers supporting different cache clients in a common set of cache clients and a common parent cache server.

5. The method of claim 4, wherein dynamically structuring a set of cache resources including the specific cache resource to account for the identified characteristic, comprises establishing a partitioned cluster of the geographically proximate cache devices, the cache devices individually caching data pertaining to a corresponding unique topic assigned by the cache server.

6. The method of claim 5, further comprising:
    designating a plurality of the cache devices as a slave device assigned to cache data pertaining to a corresponding assigned topic; and,
    designating one of the cache devices as a master device responsible for establishing a routing table of the different topics and distributing the routing table to each cache device designated as a slave device.

* * * * *